April 16, 1946.  D. HEYER  2,398,639
AUTOMATIC FILM EXHIBITOR
Filed June 30, 1941  6 Sheets-Sheet 1

Fig. 1.

INVENTOR:
DON HEYER,
BY
ATTORNEY

April 16, 1946.  D. HEYER  2,398,639
AUTOMATIC FILM EXHIBITOR
Filed June 30, 1941  6 Sheets-Sheet 4

INVENTOR:
DON HEYER,
BY
ATTORNEY

April 16, 1946.　　　D. HEYER　　　2,398,639
AUTOMATIC FILM EXHIBITOR
Filed June 30, 1941　　　6 Sheets-Sheet 5

INVENTOR:
DON HEYER,
BY
ATTORNEY

Patented Apr. 16, 1946

2,398,639

UNITED STATES PATENT OFFICE 2,398,639

AUTOMATIC FILM EXHIBITOR

Don Heyer, Los Angeles, Calif.

Application June 30, 1941, Serial No. 400,537

28 Claims. (Cl. 88—18.7)

This invention relates to continuous film exhibitors, that is, exhibitors which utilize an endless coil of film, feeding the film from one periphery to the projector and winding it on the other simultaneously.

In mechanisms of this type, it is difficult to compensate for changes in the actual length of the film caused by changes in the weather or aging of the film. This change in length affects the operation of the projector, and also affects the functioning of the coil of film in the magazine, and often causes the film to bind therein, with the result that operation of the machine in this condition scratches the film and often results in tearing the sprocket holes. This binding, in the case of machines which return the film to the magazine by winding it on the outer periphery of the coil, also frequently results in the diameter of the coil decreasing on the inner periphery to such an extent that the machine fails to function.

As the film in the magazine is acted upon by different elements, and is wound upon the coil with a varying tension, it rubs against adjacent coils, and otherwise is subject to numerous more or less unpredictable forces and influences. This tendency to bind may be present even when the film is operated under constant weather conditions with no perceptible change in length. It has been found desirable to have the film closest to the outer periphery comparatively closely wound, while the inner portion of the coil of film should be quite loose for satisfactory operation. At the same time, it is necessary to prevent the outer portion of the coil of film from actually binding and thus increasing in diameter as the film is wound thereon, or scratching the film.

It has also been found that any type of magazine driving mechanism, which is positively driven by the projector drive, lacks suitable flexibility so that the film is often placed under undue tension or may run slack and pile up in the machine.

The operation of machines of this type, by means of coins, also introduces several difficulties, the chief of which is the requirement that the machine operate upon insertion of a coin, that the machine accept a large number of coins and continue exhibiting until it has run the number of subjects represented by the number of coins, that the machine require a minimum of attention and that indication be given when the machine is out of order and that it return coins inserted when it is out of order.

It is, therefore, an object of the present invention to provide a mechanism which will automatically compensate for changes in the condition of the film.

It is a further object of this invention to provide a mechanism which will automatically adjust the film coil in response to changes in the film length.

It is a further object of the present invention to provide an improved means for separating the film convolutions and allowing free movement between them.

It is a further object of this invention to provide a mechanism engaging the edges of the film convolutions and moving the film bodily in an eccentric path to separate the film convolutions.

It is a further object of this invention to provide means for promoting a different degree of separation between the convolutions in different parts of the coil.

It is a further object of this invention to provide means for the adjustment of the film tension, and means which will indicate the tension of the film.

It is a further object of this invention to provide means for shutting off the entire machine when the film tension drops below a predetermined minimum, or the film parts.

It is a further object of this invention to provide means for shutting off the machine if the bottom loop of the projector should be lost.

It is a further object of this invention to provide means which can be readily cleaned and/or replaced for filtering the air which enters the projector cabinet.

It is a further object of this invention to provide means for maintaining the humidity within the cabinet substantially constant.

It is a further object of this invention to provide a system for feeding the film from and to the projector which involves a minimum of twisting of the film.

It is a further object of this invention to provide a screen and mounting which is not affected by weather conditions.

It is a further object of this invention to provide a coin operative mechanism which will mechanically add the number of coins inserted to permit the machine to continue in operation for a length of time represented by the number of coins inserted, and which can receive additional coins for future exhibition while the machine is in operation.

It is a further object of this invention to provide a machine which will give an indication when it is out of order and at the same time prevent collection of further coins.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawings.

Figure 1:
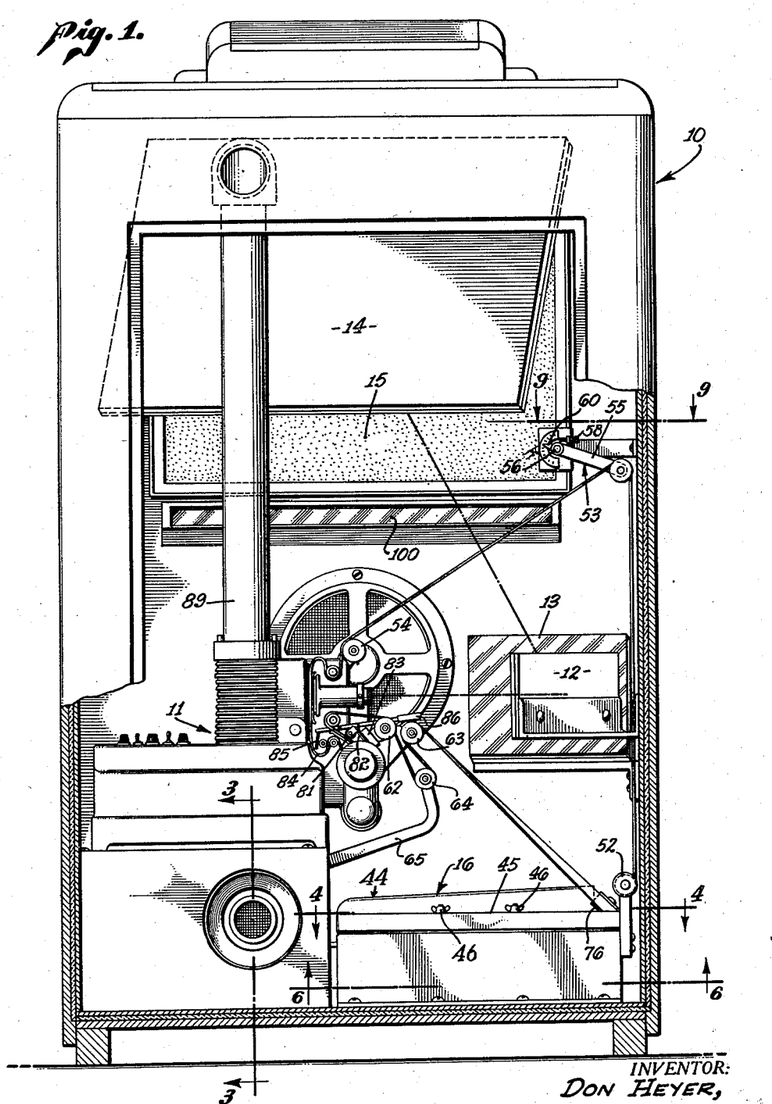
Figure 1 is a rear view of the machine with part of the back wall removed.

Referring to Figure 1, the device comprises a cabinet 10, housing a projector 11 and its associated sound equipment, and a plurality of mirrors 12, 13 and 14 for projecting an image upon a translucent screen 15. A magazine 16 also contained within the housing, takes in and pays out film in accordance with the requirements of the projector.

The magazine 16 includes a base plate 17 mounted in a horizontal position and carrying a plurality of rollers 18 arranged more or less in a circle. A coil of film 19 is intended to be supported edgewise on rollers 20 revolubly mounted on the base plate 17, with the inner periphery of the coil arranged around the rollers 18. The film is wound upon the outer periphery of the coil as it comes from the projector and is withdrawn from the inner periphery whence it goes to the projector. This coil of film is driven about by a motor 24 acting upon the rollers 20 and a roller 29 engaging the upper edge of the coil, and another roller 37 around which the film passes as it leaves the coil.

The edge engaging rollers 20 are free to rotate on the plate 17, and, as it is necessary that all of the rollers 20 rotate with the same angular velocity, they are frictionally driven by means of a turntable 21, mounted for rotation on the underside of the plate 17 by means of a shaft 22. In order to drive this turntable, a motor 24 is provided with a suitable friction wheel 25 operating through a gear reduction and held against the turntable 21 by a spring 26.

As was mentioned above, it is desirable to provide means for causing the outermost convolutions of the coil to be more closely spaced than the innermost convolutions. For this reason the outer portions 27 of the rollers 20 are provided with a greater taper than their inner portions 28. This difference in taper has the effect of more widely separating the inner convolutions of the film coil during its rotation. The tapered roller 29 engaging the upper edge of the film coil facilitates this differential spacing of the convolutions of the coil, and also cooperates with the rollers 20 to drive the coil more positively. The tapered roller 29 is driven by a friction gear mechanism 30 and is spring mounted by means of brackets 31 and 32 so that it may press upon the upper edge of the film coil. It will be noted that this roller is of uniform taper throughout its length, which results in its bearing only upon the inner portion of the upper edge of the film coil.

In order to cause separation between the convolutions of the film coil, means is provided for imparting an axial movement to the tapered rollers 20 in addition to their rotational movement. This is accomplished by mounting the rollers on their shafts 34 for both rotary and axial movement, and mounting the turntable 21 eccentrically so that the engagement of its frictional driving surface 21a with the rollers 20 will both rotate the rollers and move them axially outwardly during rotation of the turntable. In the present instance the turntable is secured to its mounting by screws 33 passing through enlarged openings, so that the amount of eccentricity can be adjusted for best results. The rollers 20 are held in driving engagement with the edge 21a of turntable by springs 36 mounted on the roller shafts 34.

Figure 8:
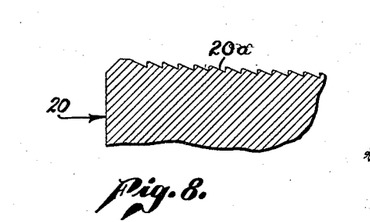
Figure 8 is a greatly enlarged fragmentary section of one of the conical rollers shown in Figure 4.

In addition to the axial movement of the tapered rollers 20, another means is provided to riffle the edges of the film convolutions. As shown in Figure 8, the rollers 20 are provided on their working surfaces with a configuration similar to a "buttress" thread. The thread 20a is arranged so that as the roller rotates, the thread tends to drive the film away from the center of the coil. Thus, as shown in Figure 8 the roller 20 has its inner end to the left, and the thread 20a on the surface thereof engages the film and tends to drive it toward the right. However, this driving is not positive, but is merely intended to break up any regions in the film coil where the convolutions have a tendency to pack together. Under normal operation, the threads constantly pass the edge of the film and tend to lift and separate the individual convolutions of the film coil.

Figure 7:
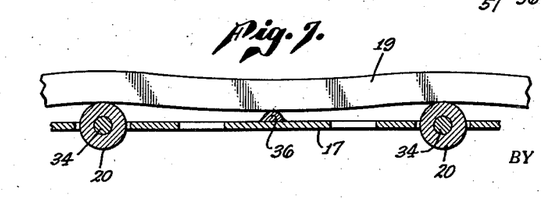
Figure 7 is a section taken on line 7, 7 of Figure 4.

In order to obtain the required driving contact between the tapered rollers 20 and the edge of the film, it is desirable to permit the coil to sag somewhat between adjacent rollers. The degree of this sag is important to obtain the best operation of the device, as it has been found that if insufficient sag is provided, the tapered rollers must be driven at a higher relative speed in order to properly rotate the film coil, which results in undue wearing of the film edges due to the relative slippage between the film and the rollers. On the other hand, if too great a sag is permitted, the slippage between adjacent convolutions of the film coil will be retarded, resulting in damage to the film and improper functioning of the film coil. In the present instance the coil of film is supported between the rollers by a plurality of fixed supporting rods 36 mounted on the base plate 17. As shown in Figure 7, these rods are sufficiently below the supporting surfaces of the tapered rollers to allow the proper amount of film sag to obtain the required driving traction on the film coil. The above described mechanism is chiefly for the purpose of driving the coil of film and for assuring that the adjacent convolutions do not stick together.

As was mentioned before, some means must be provided for taking up the stretch in the film which is caused by changing weather conditions. For this reason, the film path around the circle of rollers 18 has been provided with means to change the diameter of the film coil in response to change in tension on the film. Disregarding for the moment the means which translates the change in tension to change in diameter of the film coil in the magazine, the means which actually increases the diameter comprises the roller 37. This roller is mounted for movement toward or away from the normal film path. Perhaps the simplest method of accomplishing this movement is to mount the roller 37 on a shaft 38 which is secured to an arm 40 which is pivotally mounted on the base 17 and responds to change in tension of the film by a mechanism hereinafter described.

As film devices of this type are generally operated intermittently, and often remain idle for a considerable length of time, there is a tendency for the film which remains looped in the projector to set with a kink induced by the cooling of the hot film in the looped position. The tension exerted by the magazine drive is not sufficient in itself to straighten out this kink and accordingly, unless means are provided to straighten out the kink as soon as possible, the presence of the kink in the film coil usually results in the improper rewinding of the film on the film coil. Accordingly, an idler roller 41 is mounted on an arm 42 and is pressed by a spring 42a against the outer periphery of the film coil. When a kink is wound upon the film coil, the idler roller irons it out, and it has been found that the kink disappears after several revolutions of the film coil when such a roller is introduced.

In order to protect the film coil as much as possible, the mechanism so far described is provided with a suitable cover 44. This cover is made in two sections, the section 45 being held in place by wing nuts 46 which may be conveniently threaded upon some of the shafts supporting the rollers 18. The other half of the cover 47 is hinged at 48 to the base plate 17. This section 47 carries the roller 29 heretofore referred to as engaging the upper edge of the film coil. This part of the cover is provided with a counterweight 50 so that upon removal of the wing nuts 49 which secure it in place, the cover may be raised and will be held in raised position by the counterweight 50, for ready insertion of the film.

Figures 2, 2A:
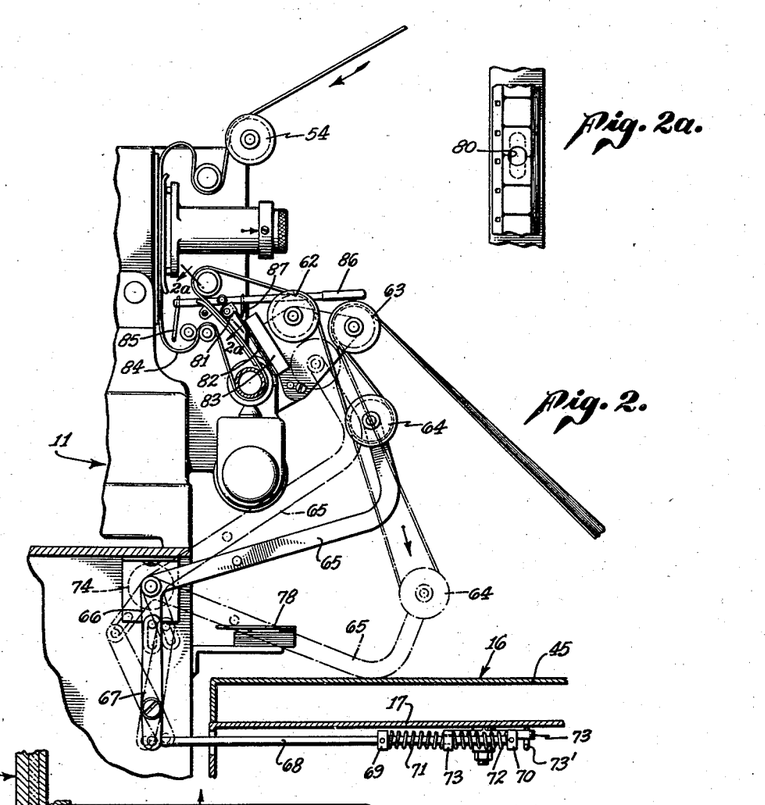
Figure 2 is an enlarged fragmentary view of part of the mechanism shown in Figure 1.
Figure 2a is a view taken on line 2a—2a of Figure 2.
Figure 4:
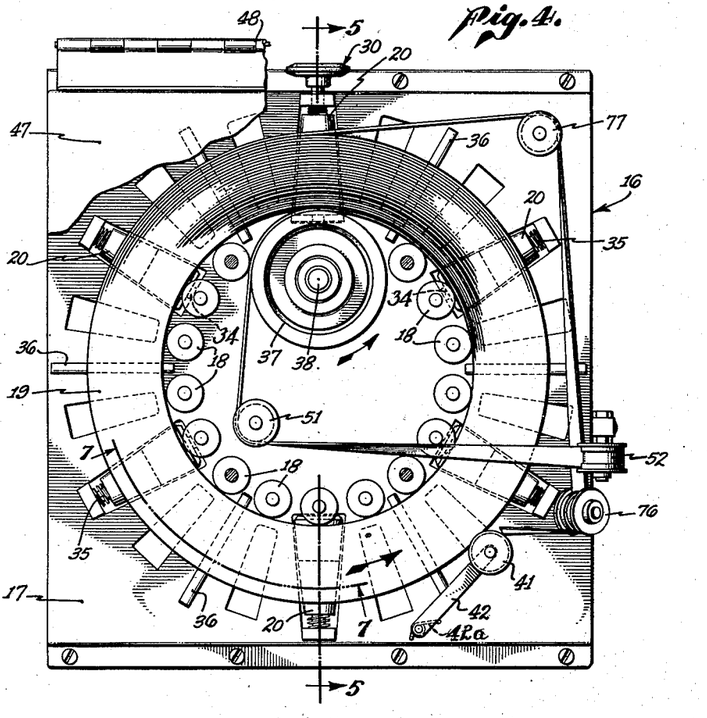
Figure 4 is an enlarged section taken on line 4, 4 of Figure 1.
Figure 5:
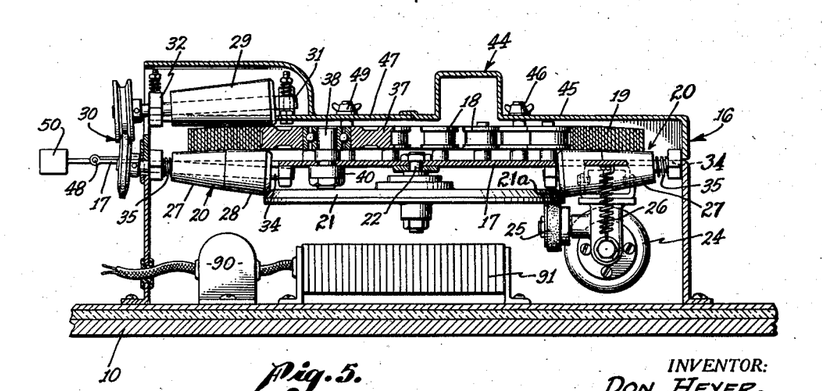
Figure 5 is a section along line 5, 5 of Figure 4.
Figure 9:
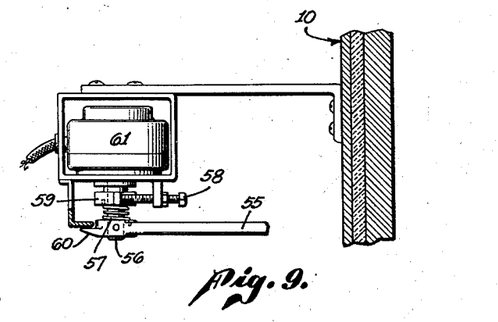
Figure 9 is a section taken on line 8, 8 of Figure 1.

The mechanism hereinbefore described supplies film to the projector from the coil and rewinds it on the coil as required. However, it is necessary to provide means which is responsive to the tension of the film between the magazine and the projector to properly control the operation of the magazine drive. It is also necessary to provide various safety device to discontinue the operation of the machine in case of film breakage. Means must also be provided to control the position of the roller 37 in response to changes in film length. The mechanism for accomplishing these results is best shown in Figures 1 and 2 and 4. As can be seen, the film passes from roller 37 to small roller 51 in the magazine, to a second roller 52 secured just outside of the magazine. From roller 52 the film passes over a tension responsive mechanism 53 and thence to the projector drive 54. The tension responsive device 53 comprises an arm 55 pivotally mounted at 56 and sustained in position against the tension of the film by an adjustable spring 57 (Figure 9). Adjustment of the tension of this spring is achieved by a set screw 58 which can be adjusted to move a collar 59 and tighten or loosen the spring 57 as conditions may require. An indicator 60 is provided to enable the operator to properly adjust the mechanism to obtain best results.

The arm 55 is responsive to variations in the tension of the film leaving the magazine and traveling to the projector to operate a rheostat 61 electrically connected with the motor 24 which drives the magazine. This rheostat is so arranged that downward movement of the arm 55 slows the motor down, while upward movement of the arm will increase the speed of the motor 24.

Figure 6:
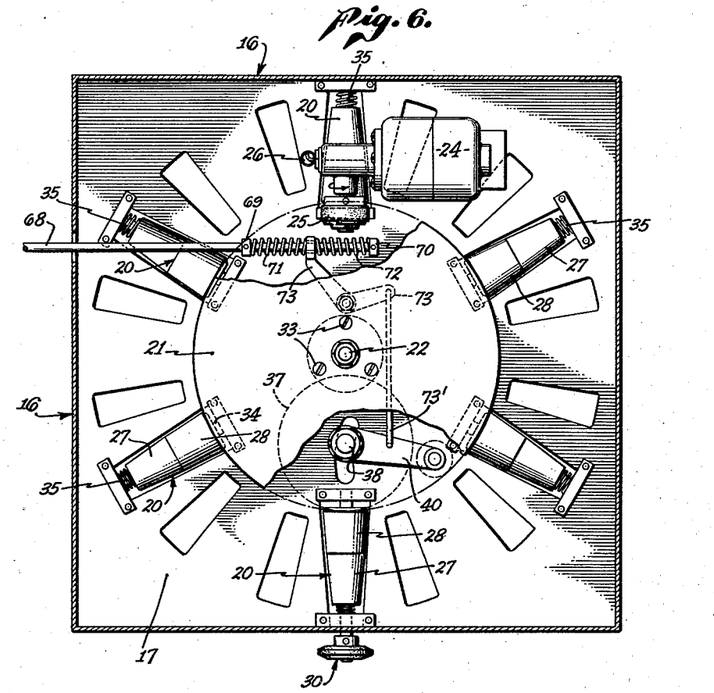
Figure 6 is an enlarged section taken on line 6, 6 of Figure 1.

The film leaving the projector and traveling to the magazine passes over a pair of rollers 62 and 63 and under an intermediate roller 64, the last mentioned roller being mounted on a pivoted arm 65 and thus free to move upwardly and downwardly to compensate for variation in tension or length of the film leaving the projector. This arm 65 in its upward and downward movement accomplishes three functions. In the first place, by means of a mechanism comprising crank 66, lever 67, and push rod 68, the motion of the arm 65 changes the position of the roller 37 heretofore referred to and thus changes the effective diameter of the film coil as above described. The push rod 68 is not directly connected to the bell crank 73 (Figures 2 and 6), but is connected thereto by means of a pair of collars 69 and 70 spaced upon the rod 68, and a pair of springs 71 and 72 between these collars bearing against the end of the bell crank 73, which is slidable on the rod 68. The bell crank 73 is pivotally mounted on the base 17 and has connected to its opposite end a push rod 73' which connects it with the arm 40. The arm 40 as heretofore explained is pivotally mounted to the base 17 and provides an adjustable mounting for the roller 37. A downward movement of the arm 65 in response to a reduction of the tension or length of the film thus increases the inner diameter of the film coil. At the same time the rotational velocity of the film coil is increased by motion of the arm 65 operating the rheostat 74. As shown in Figures 1 and 4 the film passes from roller 63 to an idler 76 and into the magazine where it passes over another idler 77 whence it is wound upon the film coil. The third function performed by the arm 65 is the stopping of the machine in the event that the film should part after it leaves the projector, or the tension in the film between the projector and the magazine should decrease sufficiently to introduce a danger of the film leaving the rollers. If shut off means were not provided it can be seen that if the film should part after it leaves the projector the magazine would not take up the film, and this would result in filling the cabinet with loose film. For this reason a switch 78 is provided which is operated to shut off the machine and perform other functions when the arm 65 passes downwardly to the lowermost position shown by light broken lines in Figure 2.

The above described mechanism will function to exhibit pictures if some means is provided to start the machine upon insertion of a coin or to stop the machine upon completion of the showing of the amount of film intended to be shown for each coin. In order to control the length of film which is shown, the film is provided with an aperture 80 (Figure 2a) at the end of each subject. This aperture passes under a small roller 81 secured to an arm 82, the arm pressing the roller 81 against the film. Upon arrival of an aperture 80 at the roller 81 the roller will move downwardly. This actuates a switch 83 to either stop the machine or actuate a mechanism subtracting one subject if more than one coin has been inserted. This switch also may be actuated by the loss of the bottom loop of film in the projector. Loss of the bottom loop would result in loss of synchronism between the sound emitted from the speakers and the motion of the actors seen upon the screen. In addition to this, loss of the bottom loop without means to shut off the machine upon such loss will cause the tearing of the sprocket holes of a large amount of film. For this reason the bottom loop 84 passes underneath a finger 85 which is secured to a weighted lever arm 86, which in turn has a projection 87 bearing against the arm 82 supporting the roller 81. Loss of the loop will force the finger 85 upwardly and press the lever 82 downwardly thus stopping the machine. This completes the description of the control mechanism which is controlled by the film.

Figure 3:
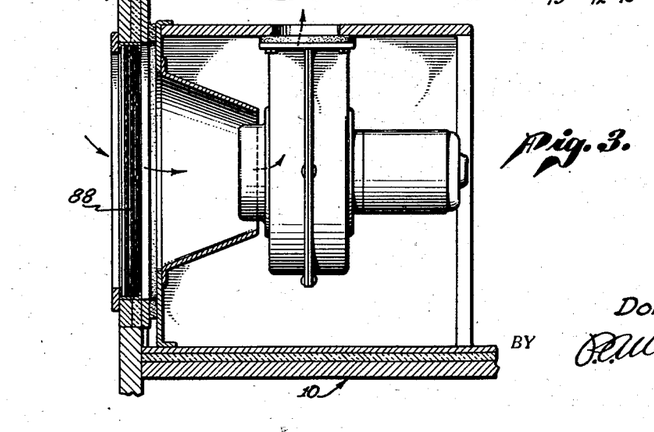
Figure 3 is an enlarged section taken on line 3, 3 of Figure 1.

In order to keep the interior of the cabinet at a satisfactory temperature a blower is provided for taking in air and cooling the projector. This blower mechanism is shown in Figure 3 and is controlled by the same circuit which operates the projector so that it runs when the projector is on and stops when the projector is off. The blower is provided with an inlet opening closely adjacent the rear door of the cabinet. A filter 88 masks this opening and permits the blower to draw filtered air into the cabinet whence it is drawn by another blower into the projector to the lamp house and up the stack 89 and out of the machine. This second blower is a part of the projector and not shown. The filter 88 is placed in the door so that it may be readily removed by simply taking off the door.

In addition to filtering the air within the cabinet it is desirable to control the humidity of the air therein. When projectors with continuous film mechanism are installed there are often long periods of time during which they are not in operation. When they are not in operation, the film within the cabinet has a tendency to lengthen due to absorption of moisture. This lengthening of the film can be taken care of if it takes place while the machine is in operation as can the shrinkage which occurs during operation of the machine. However, when it takes place while the machine is not operating, starting the machine may cause the arm 65 to drop, thus shutting off the machine by means of switch 78. This necessitates that someone lift the arm to again start the machine. To avoid the necessity of such attention after the machine has been standing idle for some time, a humidity control is provided which is responsive to the atmospheric conditions existing within the cabinet. This comprises a humidity responsive device 90 of well known form and an electrical heater 91. The control 90 is intended to start the heater 91 when the humidity rises to a predetermined value, and thus lower the humidity.

Figures 10, 11:
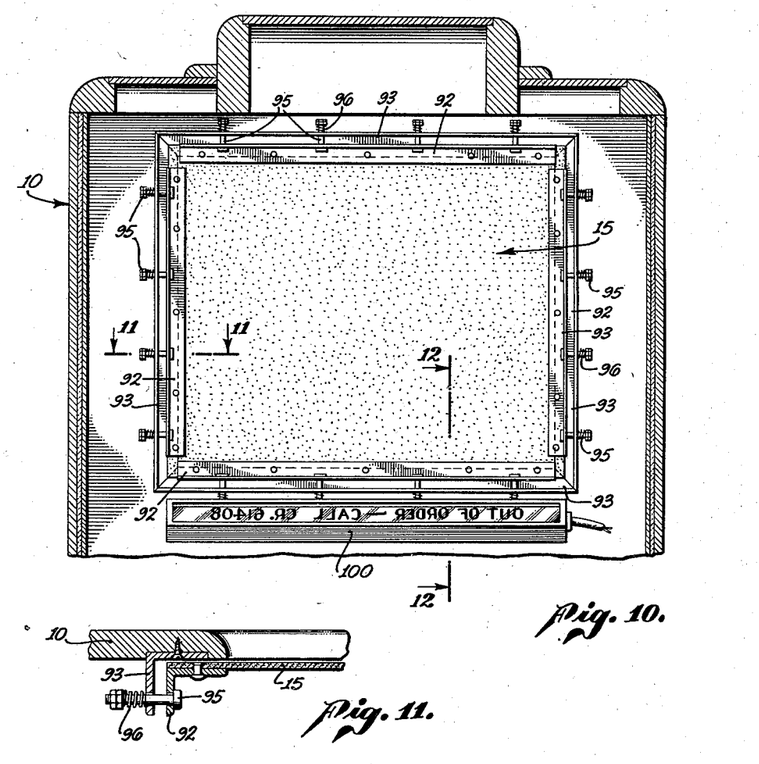
Figure 10 is a section of the upper part of the cabinet showing the projection screen and the mounting therefor.
Figure 11 is a section taken on line 11, 11 of Figure 10.
Figure 12:
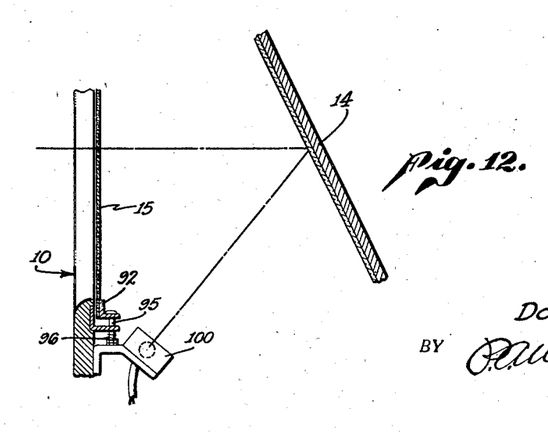
Figure 12 is a section taken on line 12, 12 of Figure 10.

The screen which is utilized in devices of this type is most satisfactory if made of thin sheets of plastic with one side roughened. While such screens are satisfactory from the optical point of view they suffer from a tendency to expand and contract upon change of humidity in the air. The screen will either bulge and wrinkle during damp weather or pull loose from the mounting in dry weather. In order to obviate this difficulty the mounting shown in Figures 10 and 11 is employed. The screen 15 of flexible plastic sheet rendered translucent by any suitable method is secured to the angles 92 by any suitable means such as riveting, clamping or cementing. These members are mounted in such a manner as to produce a tension in the film. A simple method of accomplishing this is to mount a series of angle members 93 in the cabinet and provide a plurality of bolts 95 passing through the members 92 and 93. Springs 96 between the members 93 and nuts threaded upon the bolts will maintain the screen 15 under tension and at the same time will permit expansion and contraction due to changing weather conditions.

The optical system employed consists of a number of mirrors reflecting the light from the projector to the screen. It will be noted in Figure 1 that the film passes behind one of the mirrors. Unless the film passes behind one of the mirrors it is impossible to install the mechanism 16 in a horizontal position without the employment of a large number of guide rollers to twist the film out of the plane which it normally takes on entering and leaving the projector. However, by passage of the film behind one of the mirrors it can be seen that the film takes a single quarter twist, and in its passage from the magazine to the projector another quarter twist.

In the event of failure of some part and the consequent operation of one or more of the safety devices, it is desirable to provide a distinctive signal indicating that the device is out of order. For this reason a suitable visual indicator 100 is positioned so that it is shown on the screen.

Figure 13:
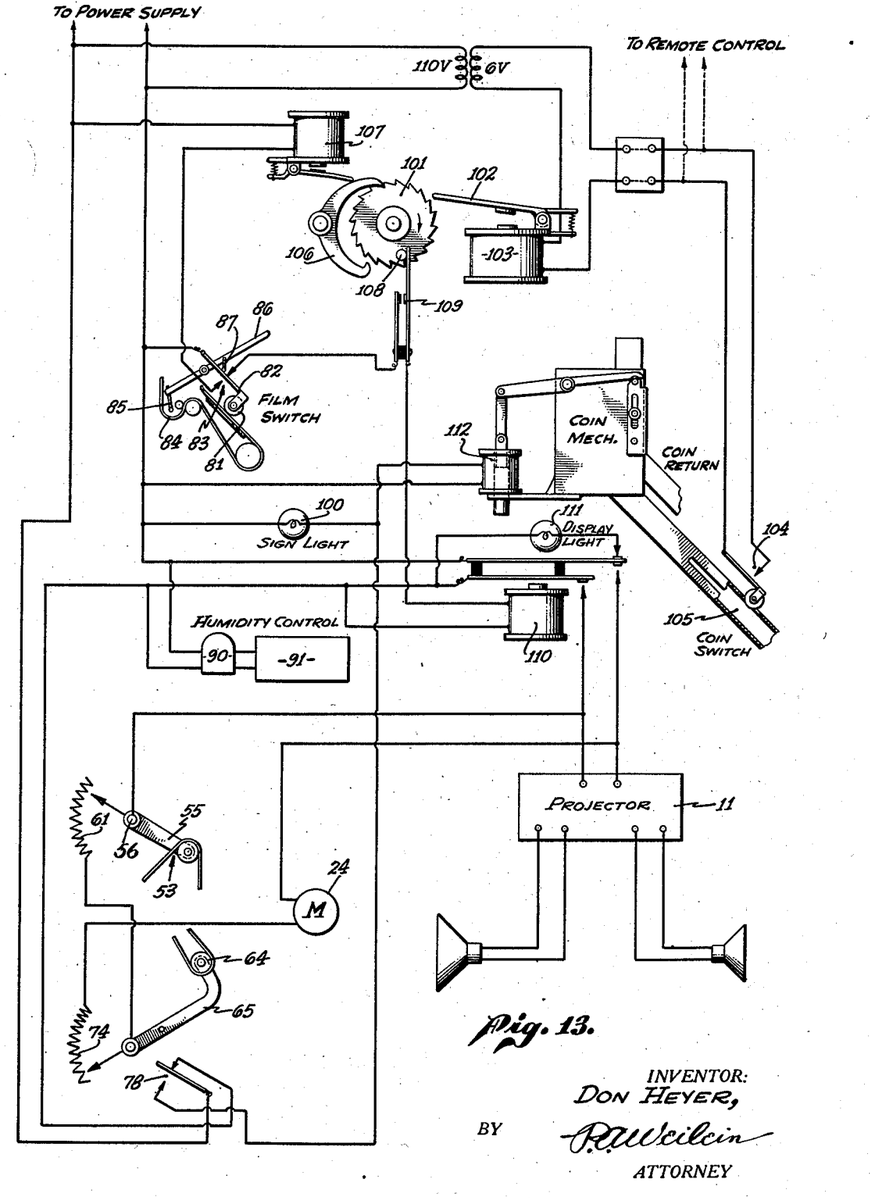
Figure 13 is a diagrammatic showing of the electrical connections utilized.

In order to permit the device to continue running if a plurality of coins is inserted, until the number of subjects shown is equivalent to the number of coins inserted, and also to permit insertion of coins at any time whether or not the machine is running, a coin operated mechanism is used which moves in one direction upon insertion of each coin, and in a reverse direction upon completion of each subject. The mechanism is used to control the operation of the machine, and to stop it when it has run through the required number of subjects. As shown in Figure 13, a rachet wheel 101 is provided with a spring tending to cause it to rotate in a counterclockwise direction. A tooth engaging finger 102 is actuated by an electromagnet 103 responsive to the energization of the coin circuit through switch 104 in response to passage of an accepted coin down the chute 105 into the collection box. The finger 102 rotates the wheel 101 to the right the space of one tooth each time the magnet 103 is energized. An escapement 106 also engages the toothed wheel 101, and is controlled by an electromagnet 107, in such a manner that it permits the wheel to rotate, under the influence of its spring, in a counterclockwise direction each time the magnet is energized. This electromagnet is controlled by the film switch 83, and thus, when one of the perforations 80 (Figure 2a) passes the roller 81, the wheel 101 makes a turn to the left for the space of one tooth. The wheel 101 carries a pin 108, which engages switch 109 and opens it when the wheel 101 rotates to the position shown in the figure, thus shutting off the mechanism.

All of the functions of the device are correlated by means of the electrical system shown in Figure 13. The parts are shown in position to start exhibiting after a coin is dropped down the chute. A coin, after passing the slug rejector mechanism passes down chute 105, and in its passage causes momentary closing of switch 104. This energizes the magnet 103 and through the finger 102, turns the rachet wheel one tooth space in a clockwise direction. Switch 109 then closes, which, through relay 110, turns off the display lights 111, and starts the projector 11, the blower, and the magazine motor 24. The switch 83 will be in the position shown, held there by the film, until the perforation 80 at the end of the subject causes it to close the circuit through magnet 107, and moves the rachet wheel 101 one tooth in a counterclockwise direction. In the event that the film loses its loop, the switch 83 will operate to stop the machine, and the machine cannot again be started so long as the switch 83, in series with switch 109, remains open, for relay 110 cannot be energized.

In the event of film breakage, the machine will run until the broken end passes through the projector, at which time arm 65 will drop, operating switch 78 to stop the machine, turn off the humidity control, and light the trouble light 100. At the same time, it will operate solenoid 112 on the coin mechanism. This solenoid 112 causes any coins inserted when the machine is out of order to be returned. Until the arm 65 is reset to proper position out of contact with the switch 78, the machine cannot be again started.

I claim:

1. In a projector for continuous film, means forming a coil, a roller in contact with an edge of the coil and mounted for axial movement during rotation, a rotating driving member operatively engaging said roller, said driving member being noncircular about its axis of rotation to effect axial movement of the film engaging roller upon rotation.

2. In a projector for continuous film, means forming a coil, said coil taking up film on its outer periphery and paying out film from its inner periphery, a driving roller extending across an edge of the coil in contact therewith, said driving roller having a groove in its working surface in such a direction as to move toward the outer periphery of the coil upon rotation of the driving roller, said groove having its face toward the inner periphery of the coil inclined with respect to the axis of the coil to permit relative slippage between the groove and the film.

3. In a projector for continuous film, means forming a coil, said coil taking in film on its outer periphery and paying out film from its inner periphery, and a tapered driving roller in contact with one edge of the film coil having a greater taper at the region toward the outer periphery of the coil than toward the inner periphery of the coil, said tapers being in the same direction.

4. In a projector for continuous film, means forming a coil, a tapered driving roller in contact with an edge of the coil and extending across the edge of the coil from the inner to the outer periphery, said driving roller having a greater taper in the region toward the outer periphery than in the region toward the inner periphery, a second driving roller in contact with the other edge of the coil opposite the first mentioned roller, and means holding said second mentioned roller in contact with the film coil with a greater pressure near the inner periphery than near the outer periphery.

5. A film coil actuating mechanism for projectors utilizing endless film comprising, means mounting a coil of film; a roller engaging an edge of the coil; and means causing axial movement of said roller during rotation thereof to promote separation of the convolutions of the coil.

6. A film coil actuating mechanism for projectors utilizing endless film comprising, means mounting a coil of film; a coil driving roller engaging an edge of the coil; means rotating said roller; and means causing axial movement of said roller during rotation thereof to thereby promote separation of the convolutions of the coil.

7. A film coil actuating mechanism for projectors utilizing endless film comprising, means mounting a coil of film; a plurality of coil driving rollers engaging the same edge of the coil; means causing axial movement of each of the rollers upon rotation thereof in such a manner that a line passing through equivalent points of each of the rollers defines a circle rotating about an axis other than its center.

8. In a projector for continuous film, means forming a coil, a pair of driving rollers engaging opposite edges of the coil and grasping it therebetween, and means moving said rollers simultaneously along lines substantially parallel to their axes, to cause separation of the convolutions of the film.

9. In a continuous film exhibitor, a magazine for holding a coil of film and driving the same, a roller in said magazine, a cover on said magazine, said cover carrying a film driving roller for engaging the side of said film coil, and hinge means interconnecting said cover and said magazine wherebysaid cover can be swung out of position for insertion of a coil of film.

10. In a continuous film exhibitor, a magazine for holding a coil of film, heating means for said magazine, and humidity responsive means operating said heating means when the humidity in said magazine reaches a predetermined maximum.

11. In a film exhibitor of the type utilizing a continuous coil of film and a projector simultaneously receiving film from the coil and returning it to the coil, means rotatably supporting said coil by engaging an edge thereof, movable means acting to maintain a substantially constant tension on the film between the projector and the coil, means to change the effective diameter of said coil, and means operatively connecting said movable means and the coil diameter changing means and including spring means adapted to be stressed by movement of said movable means, the energy stored in said spring when stressed operating said coil diameter changing means.

12. In a film exhibitor of the type utilizing a continuous coil of film and a projector simultaneously receiving film from the coil and returning it to the coil, means for supporting said film coil, said means serving to rotate the coil to take up film from the projector on one periphery of the coil and to feed film to the projector from the other periphery of the coil, control means responsive to variation in the length of film between one periphery of the coil and the projector to vary the speed of said coil supporting and rotating means, and means to change the effective diameter of said coil operated by said control means.

13. In a film exhibitor of the type utilizing a continuous coil of film and a projector receiving film from one periphery of the coil and returning it to the other periphery, means for supporting said film coil, said means serving to rotate the coil to take up film from the projector on one periphery of the coil and to feed film to the projector from the other periphery of the coil, means responsive to a variation in the length of film between one periphery of the coil and the projector to control the tension in said film length, and means responsive to a variation in the length of film between the other periphery of the coil and the projector to change to effective diameter of said coil.

14. In a film exhibitor of the type utilizing a continuous coil of film and a projector for simultaneously receiving film from the coil and returning it to the coil, means for driving said film coil to take up film from the projector on one periphery of the coil and to feed film to the projector from the other periphery, means responsive to a variation in the length of film passing from the coil to the projector, means responsive to a variation in the length of film passing from the projector to the coil, said length responsive means cooperating to control the speed of driving means, and means operated by one said length responsive means to change the effective diameter of said coil.

15. In a film exhibitor of the type utilizing a continuous coil of film and a projector for simultaneously receiving film from the coil and returning it to the coil, means for driving said film coil to take up film from the projector on one periphery of the coil and feed film to the projector from the other periphery, means responsive to a variation in one length of film passing between the coil and the projector to control the tension in said film length, means responsive to a variation in the other length of film passing between the projector and the coil to vary the speed of said driving means, and means operated by one of said length responsive means to change the effective diameter of said coil.

16. In a film exhibitor of the type utilizing a continuous coil of film and a projector receiving film from one periphery of the coil and returning it to the other periphery, means responsive to a variation in the length of film between one periphery of the coil and the projector to control the tension in said film length, and means responsive to a variation in the length of film between the other periphery of the coil and the projector to control the tension in said last mentioned film length, and means operated by one of said length responsive means to change the effective diameter of said coil.

17. In a projector for continuous film, means forming a coil of said film, a driving roller in contact with an edge of the coil and extending across said edge from the inner to the outer periphery of the coil, and a second driving roller contacting a portion of the other edge of the coil opposite the first-mentioned roller, said rollers being so formed and related as to provide clearance between the rollers for the outer portion of the coil.

18. In a projector for continuous film, means forming a coil of said film, a driving roller in contact with an edge of the coil and extending across said edge from the inner to the outer periphery of the coil, and a second driving roller contacting a portion of the other edge of the coil opposite the first mentioned roller, at least one of said rollers being tapered, the taper increasing toward the outer periphery of the coil whereby clearance between the rollers is provided for the outer portion of the coil.

19. In a continuous film exhibitor, a magazine for holding a coil of film and driving the coil, a roller in said magazine engaging an edge of the coil, a cover on said magazine, said cover carrying a film driving roller for engaging the edge of said film coil opposite said supporting roller, said rollers confining a sector of the coil between them, and means securing said cover on said magazine to permit positioning of the cover for insertion of a coil of film.

20. In a film coil actuating mechanism for projectors utilizing endless film arranged as a coil, a plurality of rollers for supporting said coil on its edge, means mounting said rollers for rotatable as well as axial movement and in generally angularly spaced radial relationship about an axis, said rollers being inclined with respect to said axis and having their inner ends bevelled, and a plate rotatable about said axis, said plate having a bevelled edge frictionally engaging the bevelled edges of said rollers and imparting rotation to the rollers.

21. In a film coil actuating mechanism for projectors utilizing endless film arranged as a coil, a plurality of rollers for supporting said coil on its edge, means mounting said rollers for rotatable as well as axial movement and in generally angularly spaced radial relationship about an axis, a circular plate rotatable about said axis, the edge of sid plate being adapted to frictionally engage the peripheries of the rollers at their inner ends, whereby rotation of the plate causes rotation of the rollers, and means resiliently urging said rollers axially to engage the plate.

22. In a film coil actuating mechanism for projectors utilizing endless film arranged as a coil, a plurality of rollers for supporting said coil on its edge, means mounting said rollers for rotatable as well as axial movement and in generally angularly spaced radial relationship about an axis, a plate rotatable about said axis, the periphery of said plate being adapted to frictionally engage the peripheries of the rollers at their inner ends, whereby rotation of the plate causes rotation of the rollers, and means resiliently urging said rollers axially to engage the plate, said plate being eccentrically mounted with respect to said axis whereby rotation of the plate imparts successive axial movement to the rollers.

23. In a film exhibitor of the type utilizing a continuous coil of film and a projector simultaneously receiving film from the coil and returning it to the coil, means for rotating said film coil to take up film from the projector on one periphery of the coil and to feed film to the projector from the other periphery of the coil, a member movable in response to variations in the length of film between one periphery of the coil and the projector, a member operable to change the effective diameter of the coil, and means forming an operating connection between said members comprising a link attached to one of said members, an element attached to the other member and slideable on the link, and a resilient connection between said element and said link.

24. In a film coil actuating mechanism for projectors utilizing endless film arranged as a coil, a plurality of rollers for supporting said coil on its edge, means mounting said rollers for rotatable as well as axial movement and in generally angularly spaced radial relationship about an axis, means for imparting rotation to said rollers to rotate said coil, and for causing the rollers to move successively on their axes to urge adjacent convolutions of film on said coil apart.

25. In a film coil actuating mechanism for projectors utilizing endless film arranged as a coil, a plurality of rollers for supporting said coil on its edge, means mounting said rollers for rotatable as well as axial movement and in generally angularly spaced radial relationship about an axis, means for imparting rotation to said rollers to rotate said coil, and for causing succeeding rollers to move progressively on their axes to urge adjacent convolutions of film on said coil apart.

26. In a film exhibitor of the type utilizing a continuous coil of film and a projector simultaneously receiving film from the coil and returning film to the coil, a plurality of rotatable members for supporting and rotating said coil by engaging an edge thereof, means for driving said members, including a common rotatable element engaging each of said members, means to change the effective diameter of said coil while said exhibitor is in operation, and mechanism operating said means in response to variation in the length or tension of the film between the projector and the coil.

27. In a film exhibitor of the type utilizing a continuous coil of film and a projector simultaneously receiving film from the coil and returning film to the coil, a plurality of rotatable members for supporting and rotating said coil by engaging an edge thereof, means for driving said members, including a common rotatable element engaging each of said members, means to change the effective diameter of said coil while said exhibitor is in operation, and mechanism operating said means in response to variation in the length or tension of the film between the projector and the coil to cause said means to change the effective diameter of the coil by small increments.

28. In a film exhibitor of the type utilizing a continuous coil of film and a projector simultaneously receiving film from the coil and returning film to the coil, a plurality of rotatable members for supporting and rotating said coil by engaging an edge thereof, means for driving said members, including a common rotatable element engaging each of said members, movable means acting to maintain a substantially constant tension on the film between the projector and the coil, and means operated in response to movement of said movable means to change the effective diameter of said coil.

DON HEYER.